United States Patent [19]

Yang

[11] Patent Number: 5,109,301

[45] Date of Patent: Apr. 28, 1992

[54] MOTOR VEHICLE AUXILIARY FRONT VIEW MIRROR

[76] Inventor: James Yang, 3F, No. 15-2, Chung Hsing Rd., Keelung City, Taiwan

[21] Appl. No.: 645,449

[22] Filed: Jan. 24, 1991

[51] Int. Cl.⁵ .............................. G02B 7/18
[52] U.S. Cl. ...................... 359/872; 359/841; 359/874; 248/481; 248/549
[58] Field of Search ............ 350/604, 605, 631, 632, 350/636; 248/548, 549, 481, 900

[56] References Cited

U.S. PATENT DOCUMENTS

| | | | |
|---|---|---|---|
| 4,464,017 | 8/1984 | Wada | 350/307 |
| 4,660,944 | 4/1987 | Suzuki et al. | 350/635 |
| 4,848,888 | 7/1989 | Polzer | 350/631 |
| 4,932,770 | 6/1990 | Caravaty | 350/627 |

Primary Examiner—Frank Gonzalez
Attorney, Agent, or Firm—Lowe, Price, LeBlanc & Becker

[57] ABSTRACT

A motor vehicle auxiliary front view mirror, comprising a base attached to the front window frame of a motor vehicle for holding a mirror through a toggle linkage. The toggle linkage has a ball portion at one end fastened in a ball socket on the base and adjustably stopped at a desired position against a packing block, and a split flange at an opposite end movably retained in a ball joint inside a ball socket on the back of the mirror permitting the mirror to be rotated on the split flange for angle position change.

1 Claim, 6 Drawing Sheets

MOTOR VEHICLE AUXILIARY FRONT VIEW MIRROR

BACKGROUND OF THE INVENTION

The present invention relates to mirrors for motor vehicles, and more particularly relates to a motor vehicle auxiliary front view mirror for reflecting the image of objects which is blocked up from the sight of a motor vehicle driver by the vehicles moving in front.

The auxiliary mirrors mounted on a motor vehicle are generally designed for reflecting the image of objects behind a motor vehicle. While driving a motor vehicle under traffic jam condition, the image of objects in front may be blocked up from the sight of a driver by the vehicles in front. Under this condition, a driver can do nothing but be very careful to slowly follow the vehicles which go ahead.

SUMMARY OF THE INVENTION

The present invention has been accomplished under the circumstances in view. It is therefore an object of the present invention to provide a motor vehicle auxiliary front view mirror which can be conveniently adjusted to reflect the image of objects which is blocked up from the sight of a motor vehicle driver by the vehicles moving in front. In the preferred embodiment of the present invention, a toggle linkage is used for connecting a mirror to a base which is fixedly attached to the front window frame of a motor vehicle. The toggle linkage has a ball portion at one end and adjustably fastened in a ball socket on the base, and a split flange at an opposite end and movably fastened through a ball joint inside the case of the mirror. Therefore, the mirror can be rotated on the split flange for adjusting angle position. The mirror can be a flat reflecting glass or convex lens for reflecting the image of objects. The toggle linkage can also be completely received inside the case of the mirror when not in use.

BRIEF DESCRIPTION OF THE DRAWINGS

The present invention will now be described by way of example only, with reference to the annexed drawings, in which.

DETAILED DESCRIPTION OF THE PREFERRED EMBODIMENT

Figure 1:
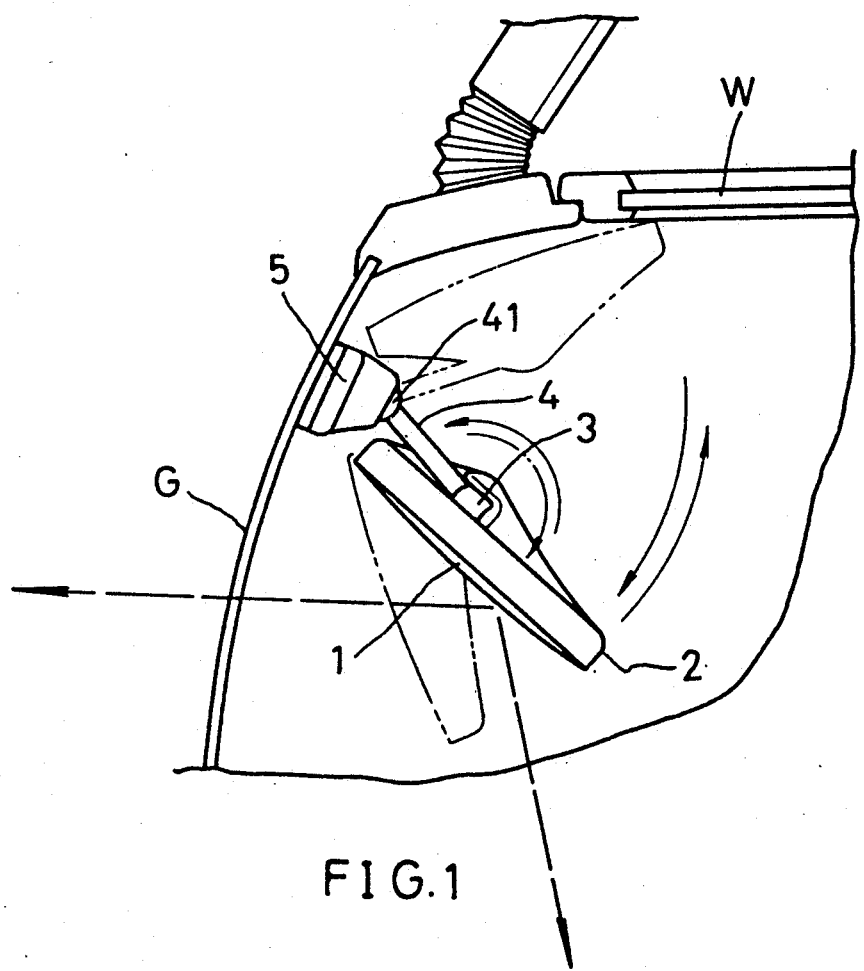
FIG. 1 is a schematic drawing of the preferred embodiment of the present invention, showing its possible front view reflecting range when it is installed in a motor vehicle.

Referring to FIG. 1, there is provided a motor vehicle auxiliary front view mirror embodying the present invention and generally comprised of a reflecting mirror 1, a case 2, a base 5 and a toggle linkage 4. The toggle linkage 4 can be received inside the case 2 so that the case 2 and the reflecting mirror 1 can be maintained in a fixed position or extended from the case 2 to the limit so that the case 2 and the reflecting mirror 1 can be flexibly rotated for adjusting angle position.

Referring to FIGS. and 6, the base 5 is fixedly attached to the front window glass at a suitable location, having a unitary ball socket 51 with a resilient packing block 52 fastened therein. The reflecting mirror 1 is attached to the case 2 at the front for reflecting the images of objects. The case 2 has an opening 23 at the back and defining therein a ball socket portion 22 and an inner channel 21. There is provided a ball joint 3 which has a hole 31 piercing therethrough and is fastened inside the ball socket portion 22. The toggle linkage 4 has a ball portion 41 at one end, which is movably fastened in the ball socket 51 and can be stopped at a desired position against the packing block 52, and a flange 42 at an opposite end, which is cut into at least two parts by at least a cut 43 so that it can be flexibly squeezed inwards to insert through the hole 31 of the ball joint 3 into the inner channel 21 of the case 2. After the flange 42 of the toggle linkage 4 is squeezed into the inner channel 21, it immediately returns to original form and stopped by the ball joint 3 from moving out of the case 2. Therefore, when the case 2 is pulled away from the toggle linkage 4 to the maximum extent, the flange 42 of the toggle linkage 4 becomes stopped against the ball joint 3 permitting the case 2 to be rotated on the flange 42 of the toggle linkage 4; when the toggle linkage 4 is inserted into the inner channel 21 of the case 2 to the extent, the case 2 becomes firmly secured to the toggle linkage 4 in position.

Figure 2:
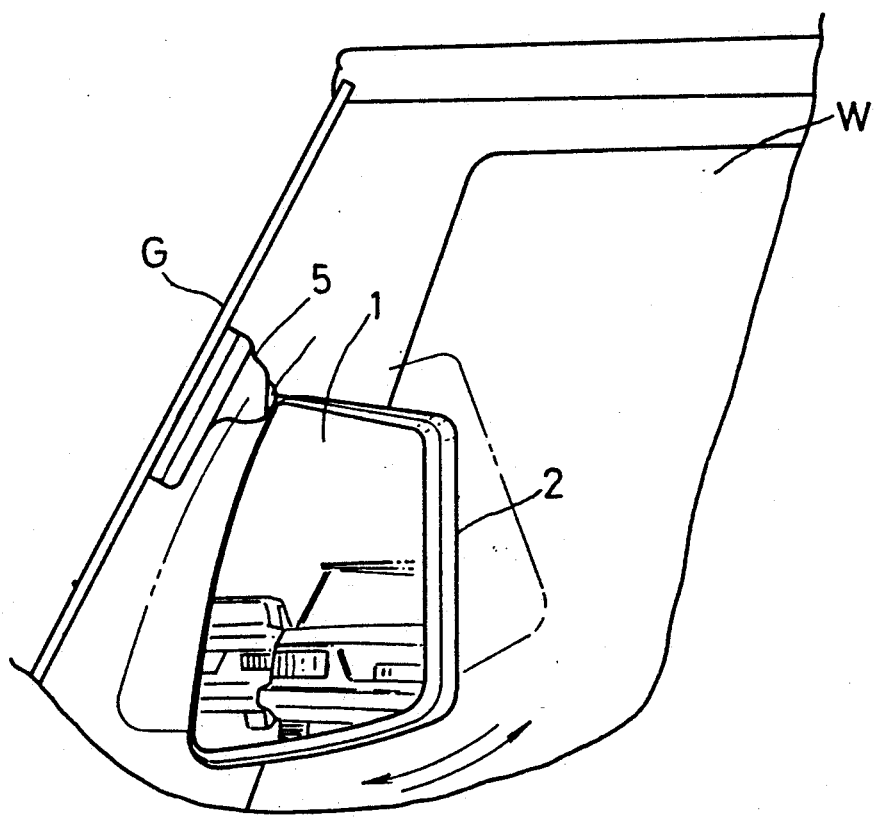
FIG. 2 is a schematic drawing of the preferred embodiment of the present invention, showing the front view of the mirror.
Figure 3:
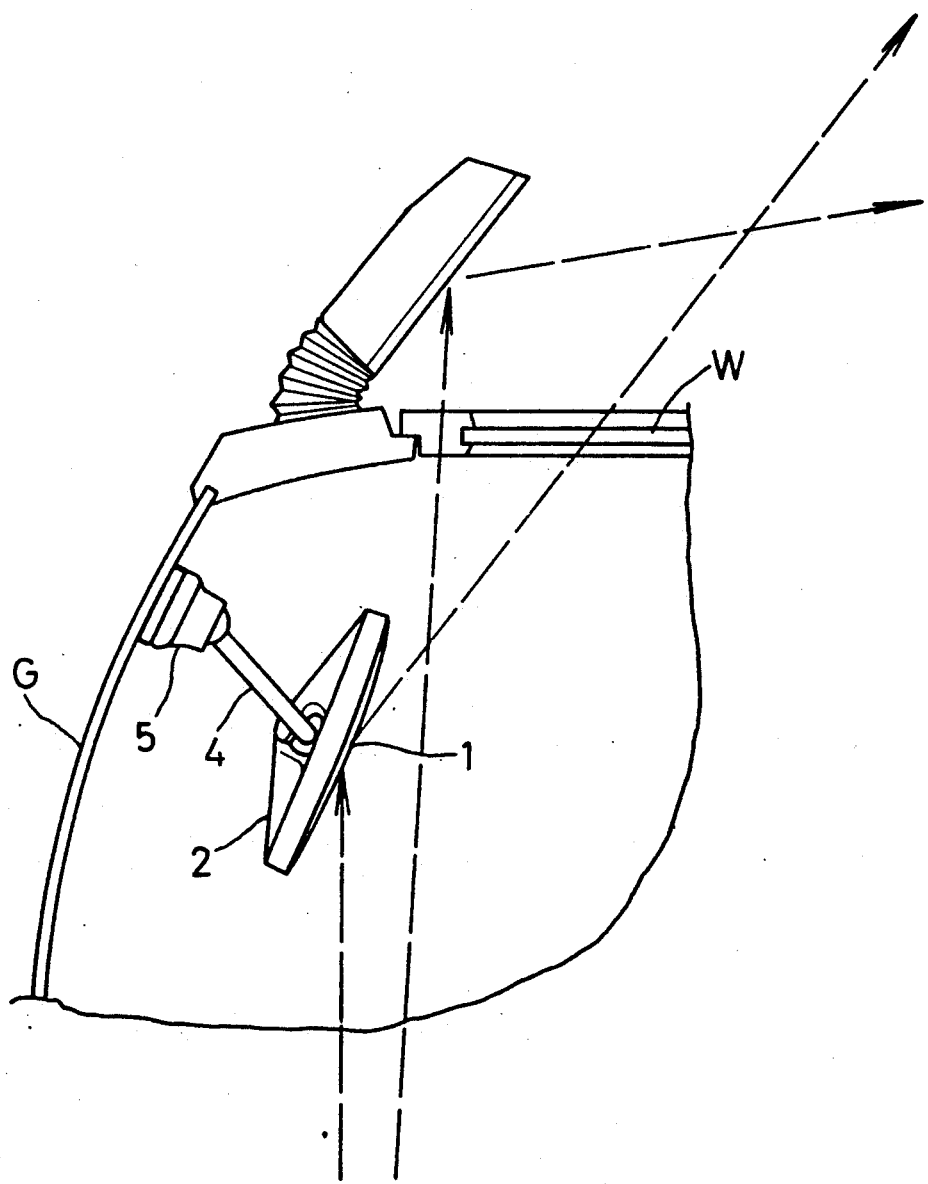
FIG. 3 is a side view of the preferred embodiment of the present invention, showing its possible rear view reflecting range.
Figure 4:
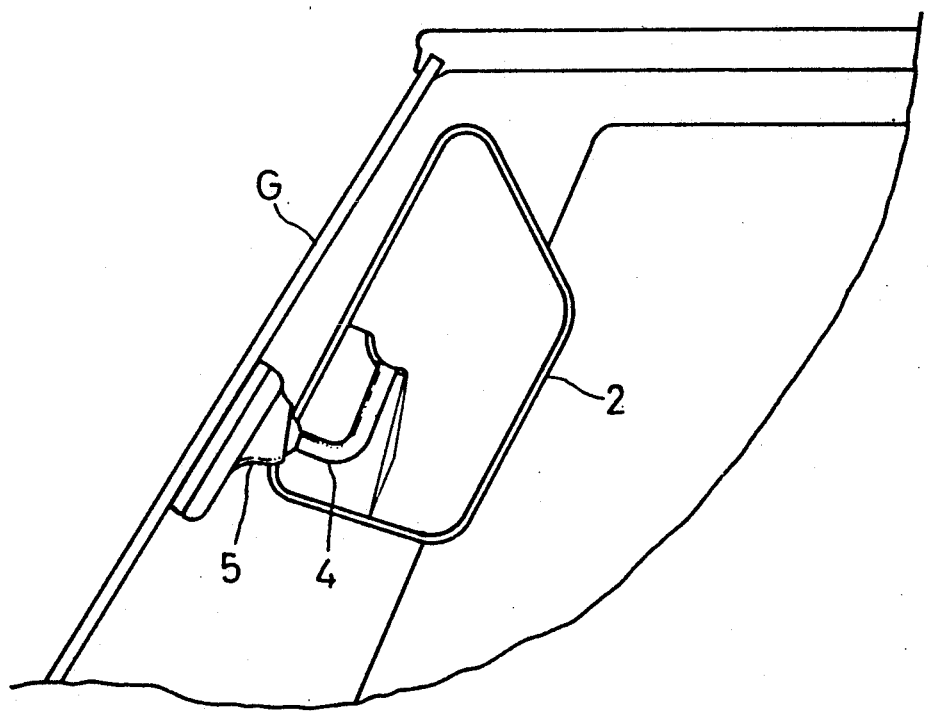
FIG. 4 is a schematic drawing of the preferred embodiment of the present invention, showing a condition when it is collapsed.
Figure 5:
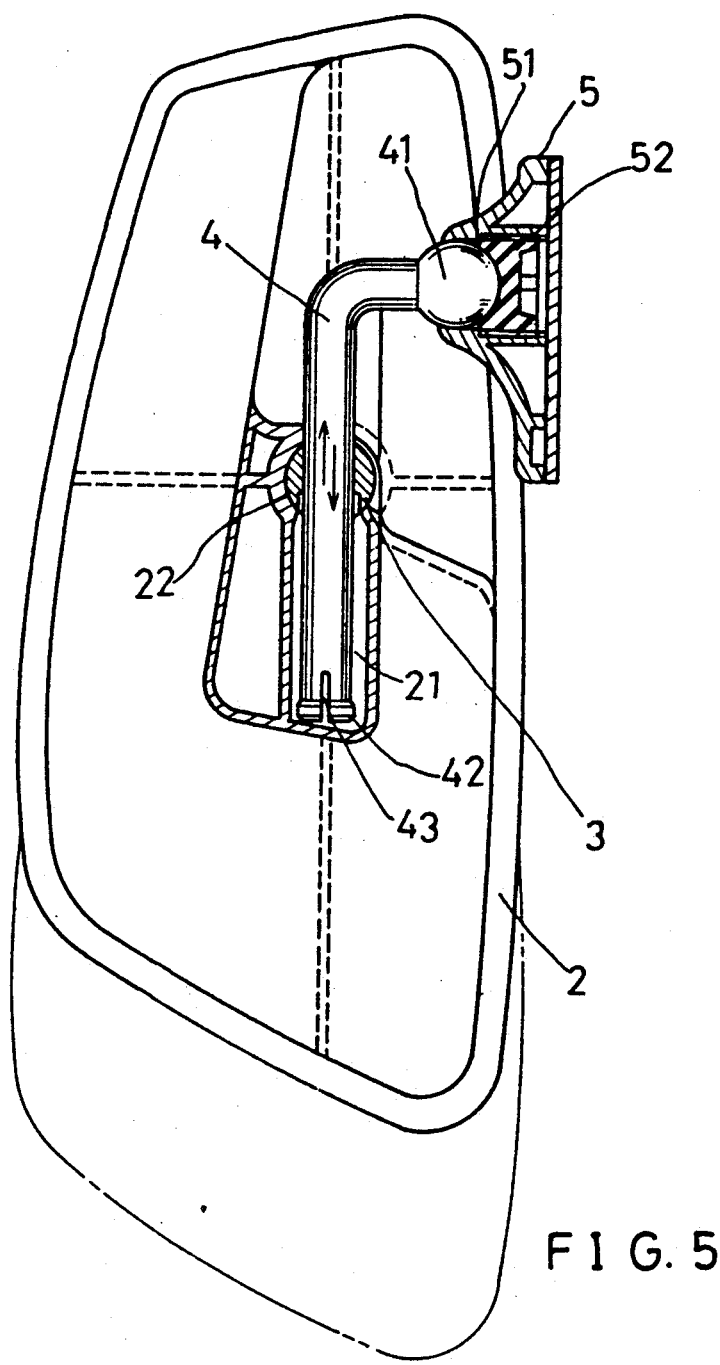
FIG. 5 is a structural sectional view of the preferred embodiment of the present invention.
Figure 6:
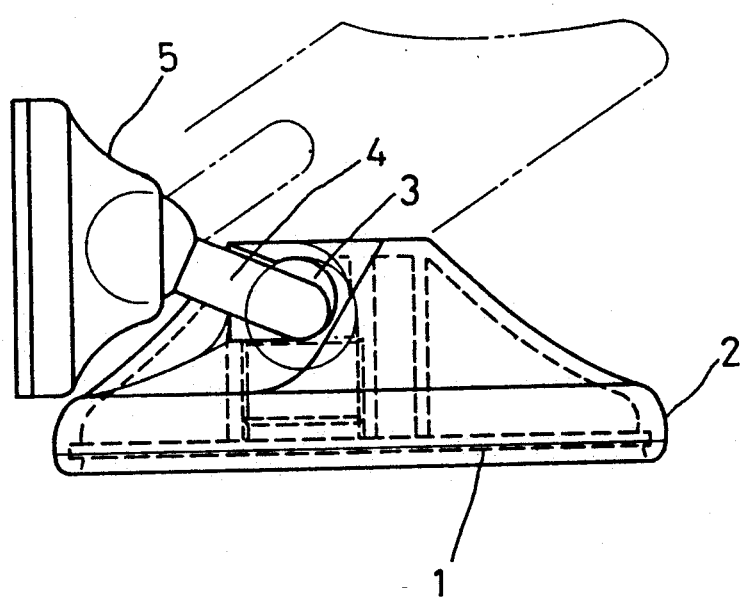
FIG. 6 is a top view taken on FIG. 5.

The motor vehicle auxiliary front view mirror of the present invention, as disclosed above, can be achieve various advantages outlined hereinafter with reference to FIGS. 2, 3 and 4.

1) Reflecting angle of the reflecting mirror can be conveniently adjusted;

2) The reflecting mirror can be adjusted to any desired angle;

3) It can be collapsed and closely received to the base to minimize space occupation when not in use;

4) It can also be used as an auxiliary rear view mirror for viewing the traffic condition behind the car that the original rear view mirror of the car can not reflect.

What is claimed is:

1. A motor vehicle auxiliary front view mirror, comprising:

a base attached to a motor vehicle at the front, having a unitary ball socket formed therein and a resilient packing block fastened inside said unitary ball socket at the bottom;

a case having a reflecting mirror attached thereto at the front, an opening made thereon at the back, a unitary ball socket portion communicating with said opening, and an elongated channel formed therein and communicating with said unitary ball socket portion;

a ball joint having a hole piercing therethrough at the center and being fastened inside said ball socket portion of said case;

a toggle linkage having a ball portion at one end, said ball portion being movably fastened in said ball socket of said base and stopped at a desired position against said packing block, and a flange at an opposite end, said flange been cut into at least two parts by at least a cut so that it can be flexibly squeezed inwards to insert through said hole on said ball joint into said inner channel of said case to become movably retained therein.

* * * * *